Figure 1:
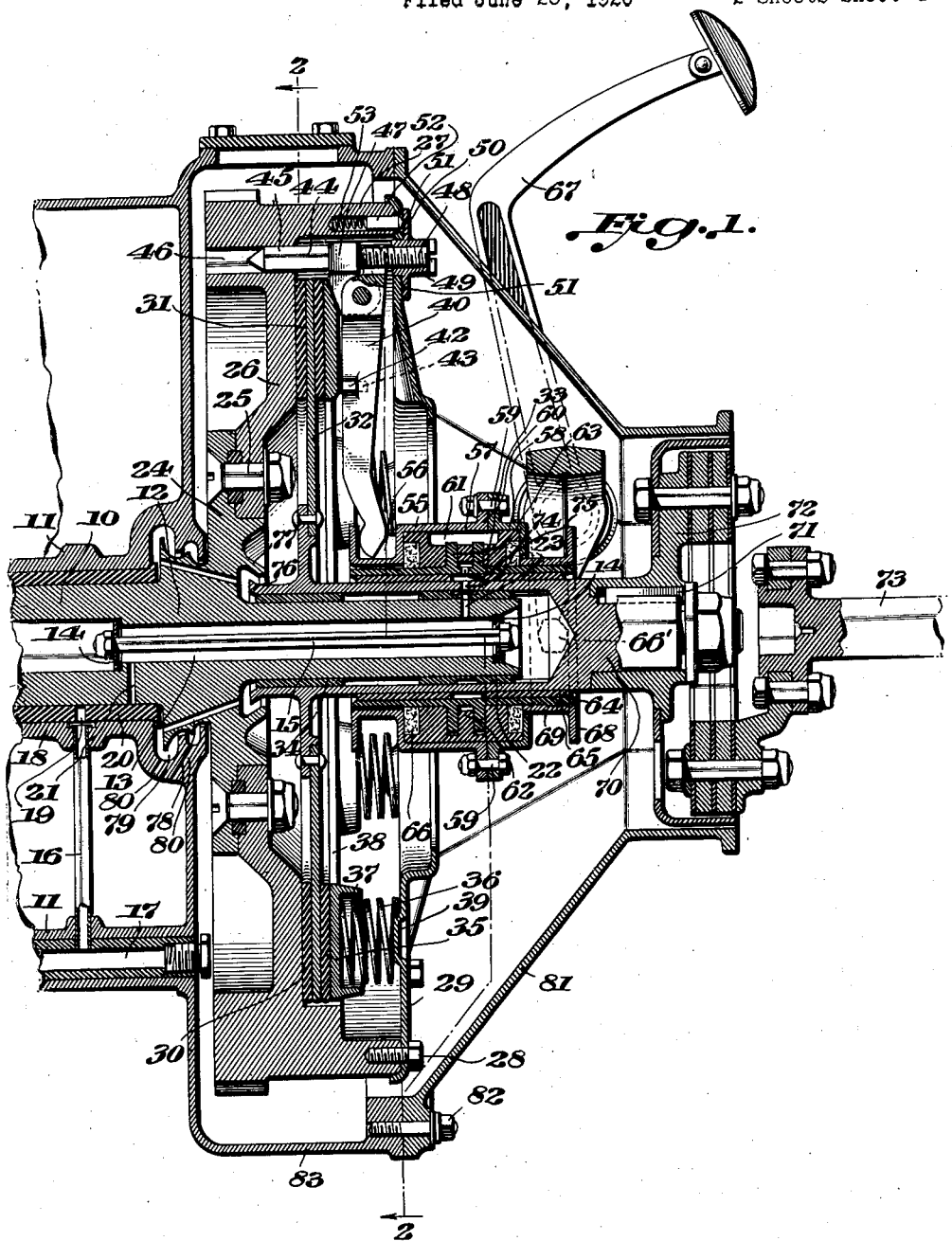

Oct. 13, 1925.

A. MOORHOUSE 1,556,706

DRIVING MECHANISM FOR MOTOR VEHICLES

Filed June 26, 1920     2 Sheets-Sheet 1

Inventor,
Alfred Moorhouse,
By Milton Sibbett, Atty.

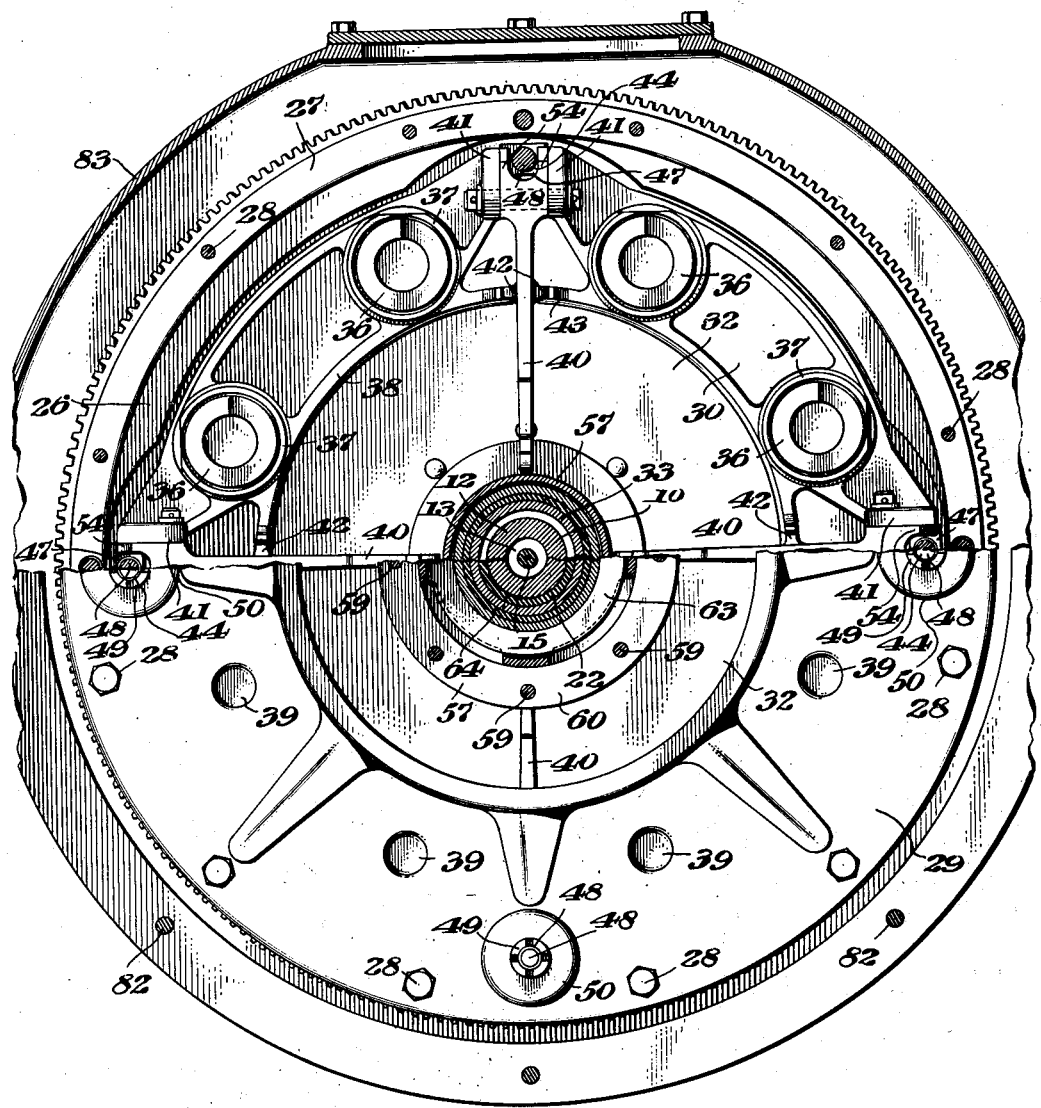

Patented Oct. 13, 1925.

1,556,706

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

DRIVING MECHANISM FOR MOTOR VEHICLES.

Application filed June 26, 1920. Serial No. 391,988.

*To all whom it may concern:*

Be it known that I, ALFRED MOORHOUSE, a citizen of the United States, and resident of Detroit, Wayne County, State of Michigan, have invented certain new and useful Improvements in Driving Mechanism for Motor Vehicles, of which the following is a specification.

This invention relates to motor vehicles, more particularly to the clutch mechanism thereof, and it has for one of its objects to provide improved means for efficiently lubricating the bearings of such clutch mechanism.

Another object of the invention is to provide means for returning to its source any excess lubricant supplied to the bearings of such clutch mechanism.

Further objects of the invention will appear from the following specification taken in connection with the drawings which form a part of this application, and in which:

Fig. 1 is a sectional view of a friction clutch constructed in accordance with my invention; and Fig. 2 is an iregular sectional view taken at right angles to Fig. 1 and substantially on line 2—2 of Fig. 1.

In the embodiment of the invention illustrated the friction clutch mechanism has been shown as mounted upon a crankshaft 10 of the motor vehicle, a portion 11 of the crankcase being also illustrated in Fig. 1. The crankshaft 10 is hollow in construction and is provided at one end with an extension 12 having a bore 13 slightly smaller in section than the bore of the main portion of the crankshaft, the bore 13 being closed at its ends by means of disks 14, these disks being secured together by means of a bolt 15. The crankshaft 10 is lubricated by means of a plurality of conduits 16, one of which is shown, these conduits connecting an oil manifold 17 with the bearing 18 of the crankshaft, and the oil being conducted through suitable radial apertures 19 to the interior of bushings 20. From the end bearing of the crankshaft oil is conducted to the interior or bore 13 of the extension 12 through a radial aperture 21, and is conducted from the bore 13 to bushing 22 by means of an opening 23 formed in the extension 12. Oil may be supplied under pressure to the manifold 17 in the usual way.

The inner end of the extension 12 of the crankshaft is provided with a laterally extending flange 24, to which is secured by means of suitable bolts 25 a flywheel 26. This flywheel constitutes one of the clutch members, and has formed on its periphery a longitudinally extending flange 27, to which is secured by means of bolts 28 a cover plate 29. The flywheel has also formed thereon a friction surface 30 which is engaged by a ring 31 preferably of fibre.

The other clutch member which transmits the motion of the fly wheel to the power transmission shaft comprises a disk 32 carried by a clutch sleeve 33, the latter being rotatably mounted on bushings 22 and 34, which in turn are carried by the extension 12 of the crankshaft.

A second clutch ring 35 also preferably formed of fibre, engages the opposite side of the clutch disk 32 from the ring 31, the rings 31 and 35 and disk 32 being normally forced in a direction toward the flywheel by means of a plurality of coil springs 36, each of which engages at one end of the spring a pocket 37 formed on a presser plate 38 and at its opposite end the cover 29. The cover plate 29 is provided with a plurality of bosses 39 upon which the outer ends of the springs 36 seat.

From the above description it will be understood that the springs 36 normally hold the clutch members in operative or power transmitting position, and means, which will now be described, has been provided for releasing the clutch members from the tension of the springs 36, or in other words, from operative position. This means comprises a plurality of levers 40, each of which, as illustrated in Fig. 2, is pivoted between a pair of offset or outwardly extending lugs 41 carried by the presser plate 38. Each of the levers 40 is provided intermediate its ends with a pair of oppositely extending lugs 42 which coact with adjacent outwardly projecting lugs or portions 43 on the presser plate, the lugs 43 guiding the levers in their movement and assisting in securing the levers against lateral strain.

In order to control the sensitiveness of the clutch releasing mechanism, or in other words, to determine the point at which this releasing mechanism becomes effective to withdraw the clutch elements from operative position, I have provided an adjustable fulcrum member for each of the levers 40. Each of the fulcrum members comprises a longitudinally movable pin 44, having a portion 45 at one end slidable in a transverse opening 46 formed in the fly-wheel 26. Each pin 44 has also intermediate its ends an enlarged portion 47, and at its end opposite the portion 45 there is provided a screw threaded portion 48. The screw threaded portions of the pins 44 are engaged by nuts 49 having laterally extending flanges 50, these flanges being provided with a plurality of depressions 51 arranged concentrically with respect to the axis of rotation of the nuts 49. The depressions 51 are engaged by plungers 52 slidably mounted in the flange 27 of the flywheel and extending through openings in plate 29, and actuated by springs 53.

From the foregoing description it will be seen that the position of adjustment of the nuts 49 determines the position of the pins 44 in the flywheel 26, and it will also be seen that the nuts 49 are held in adjusted position automatically by means of the spring pressed plungers 52.

Each of the levers 40 is bifurcated as shown at 54 in Fig. 2, these bifurcations being disposed on opposite sides of the screw threaded portion 48 of the pin and being adapted to engage the enlarged portion 47 of the pin.

The opposite ends of the levers 40 are disposed within a longitudinally movable shifting member 55, this member having at one end a channel 56 in which the ends of the levers 40 are positioned. In this instance the shifting member 55 is formed in two sections 57 and 58, these sections being secured together by means of bolts 59 which engage flanges 60 formed on the sections 57 and 58. The sections 57 and 58 also are offset forming a channel 61 extending in a direction opposite to the channel 56, the channel 61 having disposed therein thrust or clutch release bearing members 62. These bearing members are engaged by laterally extending flanges 63 formed on a sleeve 64, the latter being rotatably and slidably mounted on bushings 65, which in turn are mounted on the clutch sleeve 33. Suitable packing members 66 are enclosed within the channel 61 to prevent the escape of lubricant.

The sleeve 64 is moved longitudinally with respect to the clutch sleeve 33 by means of a yoke 66' of the usual construction, this yoke being actuated by means of a foot pedal 67, and the inner end of the yoke being positioned in a channel formed between a flange 68 formed on a collar 69 and the flange formed by one end of the section 58 of the lever controlling member 55. The collar 69 is secured to the sleeve 64 by means of a screw threaded engagement therewith.

The clutch sleeve 33 is extended as shown at 70, this extension having splined thereto, as shown at 71, a universal joint 72, power being transmitted through this joint to a transmission shaft 73.

In the previous description I have explained the method by which lubricant is conducted to the bushings 22 from the interior 13 of the crankshaft extension 12. In order to conduct this lubricant to the bushings 65, the clutch sleeve 33 is provided with a transversely extending aperture 74, and the sleeve 64 is also provided with an opening 75 to conduct the lubricant to the thrust bearing members 62.

The clutch sleeve 33 is flared as shown at 76, this flared end being positioned within an inwardly extending flange 77 formed on the flange 24 of the crankshaft. From the showing in Fig. 1 it will be evident that lubricant will be discharged by the flared end 76 of the sleeve into a pocket formed by the flange 77, and the crankshaft has formed therein a plurality of inclined bores or openings 78 which conduct the lubricant from this pocket to a pocket 79 formed in the crankcase, whence it is conducted through openings 80 back into the crankcase.

The clutch mechanism is enclosed in a case 81 of any suitable construction and secured as shown at 82 to an extension 83 of the crankcase.

The operation of the clutch mechanism will now be briefly outlined: As explained in the specification, the clutch members are normally held in frictional engagement by means of the springs 36, which act between the cover plate 29 and the presser plate 38. In order to release the clutch pressure is exerted on the foot pedal 67 and this pressure is communicated through the flanged collar 69, sleeve 64 and clutch shifting member 55 to the levers 40. The outer ends 54 of the levers being seated on the portions 47 of the pins 44, it will be evident that inasmuch as these end portions cannot move, a movement of the opposite end portions which are seated in the channel 56 will necessarily cause the pivots of the levers to move, thereby causing a movement of the presser plate which carries these pivots away from the clutch elements against the tension of the springs 36. By adjusting the positions of the pins 44 the action of the levers can be controlled.

The clutch elements are lubricated as follows: Oil is transmitted from the pressure manifold 17 through conduit 16 to the end crankshaft bearing and from this bearing through openings 19 and 21 to the interior 13 of the crankshaft extension 12. From the interior 13 of the extension, oil is conducted by means of the radial openings described to the bearings for the clutch sleeve 33, clutch shifting sleeve 64 and thrust bearing members 62. The oil after lubricating these bearings is delivered by the flared end 76 of the clutch sleeve 33 to the pocket formed by the flange 77 in the crankshaft, and from this pocket through openings 78 and 80 back into the crankcase.

From the above description it will be evident that a simple, practical and efficient mounting for the clutch members has been provided, and moreover, a construction permitting adjustment of the elements and the proper lubrication of the rotating parts.

Although I have in the above specification described one specific embodiment of the invention, it will be understood that the invention is capable of modification, and that modifications and changes in the construction and in the arrangement of the cooperating parts may be made without departing from the spirit or scope of the invention as expressed in the following claims.

Having thus described my invention, what I claim and desire to secure by Letters Patent is:

1. In combination, a crankcase, a crankshaft journaled therein, means for conducting lubricant to the bearings of said crankshaft, a clutch member secured to said shaft, a clutch sleeve rotatably mounted on said crankshaft and having a clutch member secured thereto, and means for conducting lubricant from the bearing of said crankshaft to the bearing of said sleeve upon said crankshaft.

2. In combination, a hollow drive shaft adapted to contain lubricant, a clutch member secured thereto, a second clutch member including a sleeve journaled on said shaft, means including a shifting member mounted on said sleeve for controlling said second clutch member, and means to conduct lubricant from the hollow drive shaft to the sleeve and to the shifting member.

3. In combination, a hollow drive shaft, a clutch member secured thereto, a second clutch member including a sleeve rotatably mounted on said shaft, clutch shifting mechanism including a sleeve slidably mounted on said said clutch sleeve, means for supplying lubricant through the shaft to said sleeves, and means for returning excess lubricant from the sleeves to its source of supply.

4. In combination, a hollow driving shaft, a driven shaft, a clutch to connect said shafts having a release bearing, a source of lubricant, means to lubricate the release bearing from said source through the hollow shaft, and means to return lubricant from the bearing to said source.

5. In combination, a crankcase and crankshaft carried thereby, a clutch member secured to said crankshaft, a second clutch member rotatably mounted on said crankshaft, means for conducting lubricant to the bearing of said crankshaft in said crankcase, means for conducting lubricant from said bearing to the bearing of said second clutch member on said crankshaft, and means for returning lubricant from said last named bearing to said crankcase.

6. In combination, a hollow drive shaft adapted to contain lubricant, a clutch member secured thereto, a second clutch member including a sleeve rotatably mounted on said shaft, means for associating the clutch members in power transmitting relation, a release bearing adapted to retract said means, and means for supplying lubricant from the hollow shaft to said sleeve and said release bearing.

7. In combination, a hollow drive shaft, a clutch member secured thereto, a second clutch member including a sleeve journaled on said shaft, a source of lubricant supply, means for conducting lubricant from said source through the hollow shaft to the sleeve and means for returning lubricant from the sleeve to said source.

In testimony whereof I affix my signature.

ALFRED MOORHOUSE.